United States Patent Office

3,346,666
Patented Oct. 10, 1967

3,346,666
POLYMERIC DICARBOXYLIC ACIDS OF BLOCK COPOLYMERS OF ALPHA-METHYL STYRENE AND CONJUGATED DIOLEFINS AND METHOD OF MAKING THE SAME
Kent S. Dennis, Midland, Mich., assignor to The Dow Chemical Company, Midland, Mich., a corporation of Delaware
No Drawing. Filed Oct. 21, 1965, Ser. No. 500,285
6 Claims. (Cl. 260—879)

This application is a continuation-in-part of my application Ser. No. 275,520, filed Apr. 23, 1963.

This invention concerns certain new polymeric dicarboxylic acids and relates to a process for making the same. It pertains especially to dicarboxylic acids of block copolymers of alkenyl aromatic compounds and conjugated diolefins.

It is known to make carboxylic acids of homopolymers of monoalkenyl aromatic hydrocarbons by polymerizing the monoalkenyl aromatic compound in the presence of an anionic catalyst, e.g. addition compounds of alkali metals and naphthalene, diphenyl, etc., while having the reactants dissolved in a suitable solvent such as an organic ether that is non-reactive with the monomer, to form a living polymer having reactive negatively charged end groups and reacting the living polymer with carbon dioxide, whereby the negatively charged end groups of the polymer chains are converted to the corresponding carboxylic acid groups.

It has now been discovered that polymeric dicarboxylic acids of block copolymers of alkenyl aromatic hydrocarbons and aliphatic conjugated diolefins salts of which polymeric dicarboxylic acids are soluble can readily be obtained by polymerizing an aliphatic conjugated diolefin containing from 4 to 6 carbon atoms in the molecule such as butadiene, isoprene, piperylene or dimethylbutadiene, or mixtures of said diolefins, with a mixture of the alkali metal addition compounds of alpha-methyl styrene trimers to hexamers, and preferably alpha-methyl styrene tetramer, in an anhydrous ether solvent to obtain the block copolymers having a narrow molecular weight distribution and reactive negatively charged terminal carbon atoms on the block copolymer chains and thereafter reacting the negatively charged carbon atoms with carbon dioxide to form the corresponding carboxylic acid groups.

The alkali metal addition compounds of alpha-methyl styrene trimers to hexamers to be employed as starting materials are described in U.S. Patent No. 2,985,594. In brief, the formation of the dialkali metal addition compounds of the alpha-methyl styrene trimers to hexamers, wherein the principal product of the reaction is the alkali metal addition compound of alpha-methyl styrene tetramer, starting material and catalyst is prepared by reaction of sodium or potassium or an alloy of sodium and potassium with alpha-methyl styrene at temperatures between about −15 to 50° C. in an ether solvent such as an aliphatic ether in which there is a $CH_3$—O— group such as dimethyl ether, methyl ethyl ether, methyl isopropyl ether, methyl butyl ether, methyl propyl ether or dimethyl ether of ethylene glycol or a cyclic ether such as tetra-hydrofuran or 1,4-dioxane, which ether solvent is free or substantially free from impurities which react with the alkali metal addition compound or interfere with its formation and in the absence or substantial absence of air, oxygen, water, carbon dioxide or other materials which react with or kill the alkali addition compound.

The block copolymers to be converted into the polymeric dicarboxylic acids of the invention are prepared by reacting an aliphatic conjugated diolefin containing from 4 to 6 carbon atoms in the molecule such as butadiene-1,3 or isoprene or a mixture of butadiene and isoprene, or successively butadiene or isoprene, with the alkali metal addition compounds of the alpha-methyl styrene trimers to hexamers in an ether solvent to form the corresponding block copolymers of the type . . . AAABBBAA . . . wherein B represents moieties of the alpha-methyl styrene chemically combined in units of trimers to hexamers and chemically combined with a plurality of chemically combined moieties of butadiene and/or isoprene represented by A and in proportions of a total of from about 2 to 150 of said A moieties in the block copolymer molecule.

The reaction can be carried out at temperatures between −78 and −20° C., batchwise or in continuous manner and in an ether solvent such as an aliphatic ether in which there is a $CH_3$—O— group such as dimethyl ether, methyl ethyl ether, methyl isopropyl ether, methyl butyl ether, methyl propyl ether, or dimethyl ether of ethylene glycol, or a cyclic ether such as tetrahydrofuran or 1,4-dioxane.

In carrying out the reaction it is important that the reactants and the ether solvent be free or substantially free of impurities which react with the alkali metal addition compound or interfere with its formation and that the reaction be carried out in the absence of air, oxygen, water or carbon dioxide or other materials which react with and kill the alkali metal addition compound or inhibit or prevent reaction of the conjugated diolefin therewith to form the corresponding living block copolymer having negatively charged terminal carbon atoms in the block copolymer molecules. It may be mentioned that known ways of purifying the reactants and ether solvent such as employing freshly distilled monomers and ether solvent, and carrying out of the reaction in an atmosphere of an inert gas, e.g. nitrogen or helium, are satisfactory.

The molecular weight of the block copolymer or the proportion of the conjugated diolefin to be reacted with the alkali metal addition polymer of the alpha-methyl styrene can readily be calculated or determined. Since the starting material is an alkali metal addition compound of alpha-methyl styrene trimers to hexamers, and is principally the alkali metal addition compound of alpha-methyl styrene tetramer the degree of polymerization of the living block copolymer can be expressed by the equation:

$$D.P. \cdot \frac{(X)}{0.5Z} + Y$$

wherein X is the gram moles of conjugated diolefin monomer added, Z is the number of equivalents of alkali metal addition compound or its volume in liters times its normality (normality is that volume of solution in liters of the alpha-methyl styrene trimers to hexamers required to supply one gram mole of alkali metal), and Y is the average number of alpha-methyl styrene moieties in the alkali metal addition compound.

The conjugated diolefin can be butadiene, isoprene, dimethyl butadiene or piperylene, and is used in amount corresponding to from about 1 to about 75 gram molecular proportions per gram equivalent proportion of the alkali metal alpha-methyl styrene trimer to hexamer addition complex.

The living block copolylmer having reactive negatively charged end groups in the block copolymer chain is converted to the corresponding polymeric dicarboxylate by reaction with carbon dioxide.

It is important that the reaction of the living block copolymers be carried out in a manner such that there is a large stoichiometric excess of carbon dioxide in the reaction mixture so that both reactive terminal carbon atoms of the block copolymer chain are terminated by reaction with carbon dioxide to form the corresponding polymeric dicarboxylic acid. In general, a stoichiometric excess of from 3 to 5 or more molecular proportions of carbon dioxide is satisfactory although best results are obtained by pouring the ether solution of the block copolymer onto granular solid carbon dioxide with stirring, or into admixture with a slurry of granular solid carbon dioxide and an ether solvent, e.g. tetrahydrofuran, or into a solution of gaseous carbon dioxide dissolved in an ether solvent, e.g. tetrahydrofuran.

In practice, a solution of the alkali metal addition compound of alpha-methyl styrene trimers to hexamers in the desired proportions, is prepared, or is placed, in a suitable reaction vessel which has been purged with nitrogen or other inert gas. The mixture is stirred and maintained at a reaction temperature between about $-78°$ and $-20°$ C., while adding the conjugated diolefin, preferably dissolved in an ether solvent, thereto. Upon completing the reaction, the block copolymer is reacted with carbon dioxide suitably by pouring the reaction mixture onto a mixture of tetrahydrofuran and crushed solid carbon dioxide, with stirring to quickly contact the reactive block copolymer with the carbon dioxide and form the corresponding polymeric dicarboxylic acid. The polymeric acid salt can be recovered by heating under vacuum to remove the ether solvent. The polymer is purified by dissolving the salt in a solvent, e.g. benzene, toluene, xylene, hexane, or heptane, and is made acidic by bubbling a hydrohalic acid such as HCl through the solution, then is filtered and the filtrate evaporated to remove the solvent and recover the polymeric dicarboxylic acid as residue.

The polymeric dicarboxylic acids of the invention are useful as starting materials in the preparation of other chemical compositions, e.g. esters, by reaction of the acids with aliphatic alcohols. The alkali salts, such as the ammonium, sodium or potassium salts of the polymeric acids are soluble in water and aqueous solutions, and are useful as thickening agents, dispersing agents and suspending agents.

The following examples illustrate ways in which the principle of the invention has been applied but are not to be construed as limiting its scope.

*Example 1*

*Part A.*—A charge of 293 ml. of alpha-methyl styrene, 0.25 gram of anthracene and 1207 ml. of tetrahydrofuran which had been purified by distilling it from a sodium-biphenyl addition compound dissolved in tetrahydrofuran was placed in a three liter glass reaction vessel that had been purged with nitrogen gas to remove air and oxygen, and which vessel was equipped with a stirrer and reflux condenser. The mixture was stirred and heated to 50° C. Tiny pieces of potassium metal, in total amount equal to about 0.1 gram of potassium, was added until the solution turned a red color. The vessel was cooled by blowing a stream of cool air thereover while adding to the solution in the vessel a total of 54.9 grams of a dispersion of finely divided sodium metal particles in decalin, which dispersion consisted of 47.2 percent by weight of metallic sodium, in a period of 12 minutes, after which the sodium alpha-methyl styrene trimer to hexamer addition compound was cooled to room temperature. It was analyzed and was found to consist of a 0.708 normal solution of sodium alpha-methyl styrene trimer to hexamer complex, and to consist principally of sodium alpha-methyl styrene tetramer.

*Part B.*—A charge of 1357 ml. of the 0.708 normal solution of the sodium alpha-methyl styrene trimers to hexamers was placed in a glass reaction vessel equipped with a stirrer and was cooled in a Dry Ice-acetone bath. The mixture was stirred. A feed solution consisting of 400 ml. of tetrahydrofuran having dissolved therein 150 ml. of butadiene-1,3, was added to the solution of the sodium alpha-methyl styrene trimers to hexamers over a period of 20 minutes. The resulting mixture was poured onto and blended with a mixture of 350 ml. of tetrahydrofuran saturated with carbon dioxide gas and 800 grams of crushed Dry Ice. The resulting mixture was allowed to warm to room temperature. It consisted of two layers; (1) a pasty white polymer mass on the bottom and (2) a clear solution on top. The clear solution was decanted. The polymer mass was evaporated to leave a residue of a friable solid. It was slurried in benzene, was saturated with HCl gas, then was filtered. The filtrate was evaporated to dryness. There was obtained 374 grams of polymeric dicarboxylic acid as a light brown solid. It was analyzed and found to contain 2.49 milliequivalents of carboxylic acid (—COOH) groups per gram of the solid product. The product was 98.4 percent polymeric dicarboxylic acid. Alkali salts of the polymeric dicarboxylic acid were soluble in water.

*Example 2*

In each of a series of experiments, a solution of tetrahydrofuran containing sodium alpha-methyl styrene trimer to hexamer addition compounds was prepared employing procedure similar to that employed in part A of Example 1. The solution having a normality as stated in the following table was fed at a rate as stated in said table to a reaction zone wherein it was rapidly mixed with a solution of about two parts by volume of tetrahydrofuran and one part by volume of butadiene-1,3, also fed to said reaction zone at a rate as stated in said table. The mixture was maintained and was allowed to react at a temperature as stated in said table. The reacted mixture was continuously withdrawn from the reaction zone and was fed into admixture with tetrahydrofuran saturated with carbon dioxide gas and containing crushed solid carbon dioxide. The polymer product was recovered employing procedure similar to that employed in part B of Example 1. A charge of 10 grams of the polymer product was dissolved in 10 grams of ethylene glycol monobutyl ether. This solution was mixed with 10 grams of an aqueous 5.5 weight percent solution of ammonium hydroxide, then was diluted with 20 grams of water. The resulting solution was examined for clearness and for change upon diluting with water. Table 1 identifies the experiments and gives the proportions of the starting materials employed and the reaction conditions. The table also gives the average number of the butadiene moieties in the polymeric product as determined by analysis. The product has the general structure:

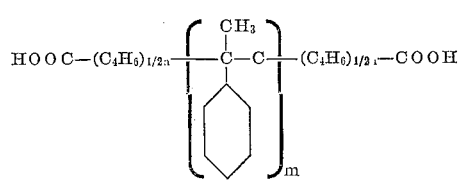

wherein $n$ has an average value of from 2 to about 150, $m$ has a value from 3 to 6 and is principally 4, and the hydrogen atoms of the —COOH groups are replaceable with alkali such as $NH_4$, Na, K, or Li, to form the corresponding salts.

TABLE 1

| Run No. | Solution of Sodium Alpha-methyl Styrene Trimer to Hexamer | | Solution of Butadiene | | Reaction Temp., °C. | Product | | |
|---|---|---|---|---|---|---|---|---|
| | Normality | Feed, ml./min. | Conc., gm./ml. | Feed, ml./min. | | $C_4H_6$ Moieties, Av. No. | Aqueous Solution of $NH_4$ Salt | Remarks |
| 1 | 0.519 | 75 | 0.221 | 103 | −78 | 20 | Clear | Clear at all dilutions. |
| 2 | 0.1486 | 50 | 0.217 | 93 | −60 | 96 | do | Do. |
| 3 | 0.0673 | 40 | 0.220 | 50.6 | −20 | 146 | Translucent | A stable dispersion upon dilution. |

I claim:
1. A method of making a polymeric dicarboxylic acid which comprises polymerizing from about 2 to about 150 gram molecular proportions of an aliphatic conjugated diolefin having from 4 to 6 carbon atoms in the molecule in a substantially anhydrous inert liquid solvent comprising an organic ether at temperatures between −78° and −20° C. in contact with an initiating polymerization catalyst consisting of an alkali metal addition compound of alpha-methyl styrene trimers to hexamers with said alkali metal at each end of said alpha-methyl styrene moiety to form a block copolymer of the type . . . AAABBBAA . . . wherein B represents the alpha-methyl styrene moieties and A represents the aliphatic conjugated diolefin moieties and in which the terminal carbon atoms of the block copolymer chains are negatively charged end groups and thereafter reacting the block copolymer with carbon dioxide whereby the block copolymer is converted to the correspondingly polymeric dicarboxylic acid.

2. A process as claimed in claim 1 wherein the aliphatic conjugated diolefin is butadiene-1,3.

3. A process as claimed in claim 1 wherein the liquid solvent is tetrahydrofuran.

4. A polymeric dicarboxylic acid consisting essentially of a block copolymer of the type . . . AAABBBAA . . . wherein B represents a plurality of chemically combined alpha-methyl styrene moieties ranging from trimers to hexamers chemically combined with a total of from about 2 to about 150 moieties of at least one aliphatic conjugated diolefin containing from 4 to 6 carbon atoms in the molecule represented by A, and having the ends of the block copolymer chains terminated with carboxylic acid groups of the formula —COOH, which block copolymer is prepared by the method of claim 1.

5. An alkali salt of a polymeric dicarboxylic acid block copolymer as claimed in claim 4.

6. A polymeric dicarboxylic acid as claimed in claim 4 wherein the aliphatic conjugated diolefin is butadiene-1,3.

References Cited
UNITED STATES PATENTS

| 2,985,594 | 5/1961 | Zimmermann | 260—431 |
| 3,135,716 | 6/1964 | Uraneck et al. | 260—880 |
| 3,149,182 | 9/1964 | Porter | 260—880 |
| 3,177,190 | 4/1965 | Hsieh | 260—880 |
| 3,265,765 | 8/1966 | Holden et al. | 260—876 |

MURRAY TILLMAN, *Primary Examiner.*

D. J. BREZNER, *Assistant Examiner.*